US009314883B2

(12) United States Patent
Choi

(10) Patent No.: US 9,314,883 B2
(45) Date of Patent: Apr. 19, 2016

(54) AUTOMATED CUTTING OF A CYLINDRICAL WORKPIECE

(71) Applicant: Siemens Energy, Inc., Orlando, FL (US)

(72) Inventor: Jae Young Choi, Murrysville, PA (US)

(73) Assignee: SIEMENS ENERGY, INC., Orlando, FL (US)

( * ) Notice: Subject to any disclaimer, the term of this patent is extended or adjusted under 35 U.S.C. 154(b) by 235 days.

(21) Appl. No.: 14/224,453

(22) Filed: Mar. 25, 2014

(65) Prior Publication Data

US 2015/0273605 A1  Oct. 1, 2015

(51) Int. Cl.
*B23K 37/02* (2006.01)

(52) U.S. Cl.
CPC ........... *B23K 37/0276* (2013.01); *B23K 37/027* (2013.01); *B23K 37/0241* (2013.01); *B23K 37/0247* (2013.01); *B23K 37/0288* (2013.01)

(58) Field of Classification Search
CPC ............................. B23K 7/006; B23K 37/0276
USPC .......................................................... 266/55
See application file for complete search history.

(56) References Cited

U.S. PATENT DOCUMENTS

| | | | | |
|---|---|---|---|---|
| 3,711,076 A | * | 1/1973 | Goetz ..................... | B23K 7/006 228/29 |
| 4,162,383 A | * | 7/1979 | Hamasaki .............. | B23K 7/006 219/125.11 |
| 6,051,803 A | * | 4/2000 | Hale, Jr. ............. | B23K 37/0276 219/121.39 |
| 2015/0273605 A1 | * | 10/2015 | Choi .................. | B23K 37/0247 148/201 |

OTHER PUBLICATIONS

Bug-O Systems, "Tool Positioning System", Affordable Automation for Welding, Cutting and Semi-Automatic Processes, Catalog, 1993, pp. 1-4, Pittsburgh, PA, US.

* cited by examiner

*Primary Examiner* — Scott Kastler

(57) ABSTRACT

Disclosed is an automated cutting of a cylindrical workpiece. According to a method a cutting device is positioned, a motor is activated to rotate about an axis to cut the cylindrical element, and cutting the cylindrical element. Further disclosed is an apparatus and system to automate the cutting of a cylindrical workpiece.

10 Claims, 5 Drawing Sheets

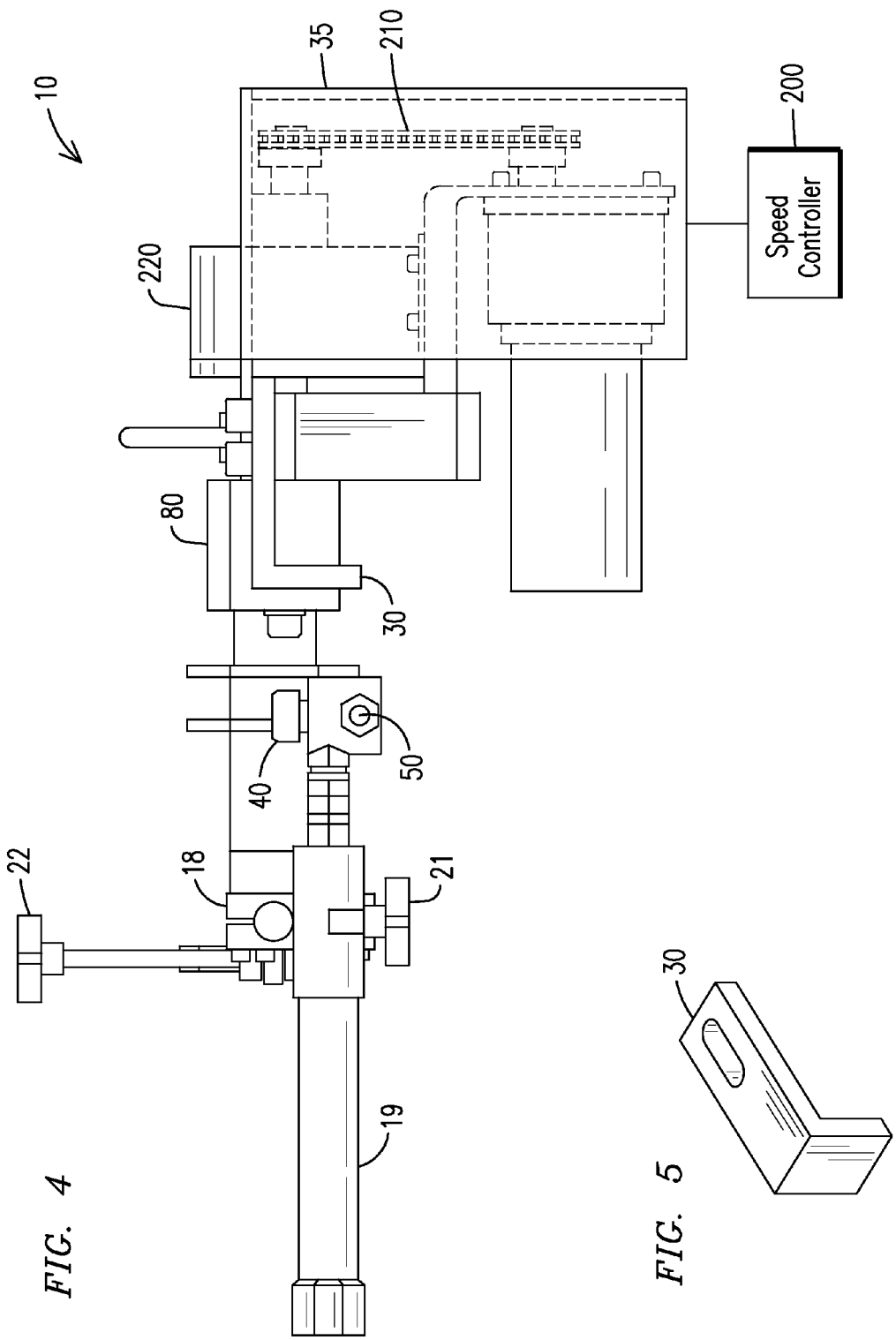

AUTOMATED CUTTING OF A CYLINDRICAL WORKPIECE

FIELD

A cutting apparatus, a method for dimensioning a segment of a cylindrical element, and a system are provided.

BACKGROUND

Traditionally, the removal of a lower half flow cone on a low pressure part of a steam turbine has been done manually with a cutting torch. Furthermore, a track cutting tool has been used which cuts the cylindrical element along the exterior, or outer diameter of the cylindrical element for which scaffolding is built along the exterior of the cylinder. The prior art track cutting tool is shown in FIG. 6.

SUMMARY

Briefly, aspects of the present invention relate to cutting apparatus, a cutting system and a method for dimensioning a cylindrical element.

A first aspect provides a method for dimensioning a segment of a cylindrical element. The method includes positioning a cutting device against an interior diameter of the segment of the cylindrical element and activating a motor to rotate the cutting device about an axis of the cylindrical element. Upon activation of the motor, the cutting device is guided along a circumferential direction against the interior diameter of the segment.

A second aspect provides a cutting apparatus. The cutting apparatus includes a cutting device, a radially extending arm rotatable about an axis and which carries a cutting device and a motor that powers the swing arm to rotate around the axis.

A third aspect provides a system including a cutting device positioned against an interior diameter of a segment of a cylindrical element, a motor rotatable about an axis of the cylindrical element and an arm extending in a radial direction of the cylindrical element that couples the motor with the cutting device. Upon activation of the motor, the cutting device is guided along a circumferential direction against the interior diameter of the segment.

BRIEF DESCRIPTION OF THE DRAWINGS

FIG. 4 illustrates a back view of the cutting apparatus according to an embodiment, and FIG. 5 illustrates a clamp according to an embodiment.

DETAILED DESCRIPTION OF INVENTION

Manual cutting of a cylindrical element on site within a steam turbine involves the risk of accident at the site. Additionally, scaffolding may need to be installed inside a flow cone and removed once the cutting is completed. Furthermore, the accuracy of the cutting may vary from time to time due to the manual nature of the process. Cutting along an outside diameter proves difficult as the space surrounding the cylindrical flow cone may be restricted, for example with scaffolding and/or further equipment. Automatic cutting of a cylindrical workpiece on an interior diameter of the cylindrical workpiece is desired. With an automatic cutting apparatus good and consistent cutting quality can be achieved and the need for scaffolding is minimized. Furthermore, the human risk factor is reduced.

Figure 1:
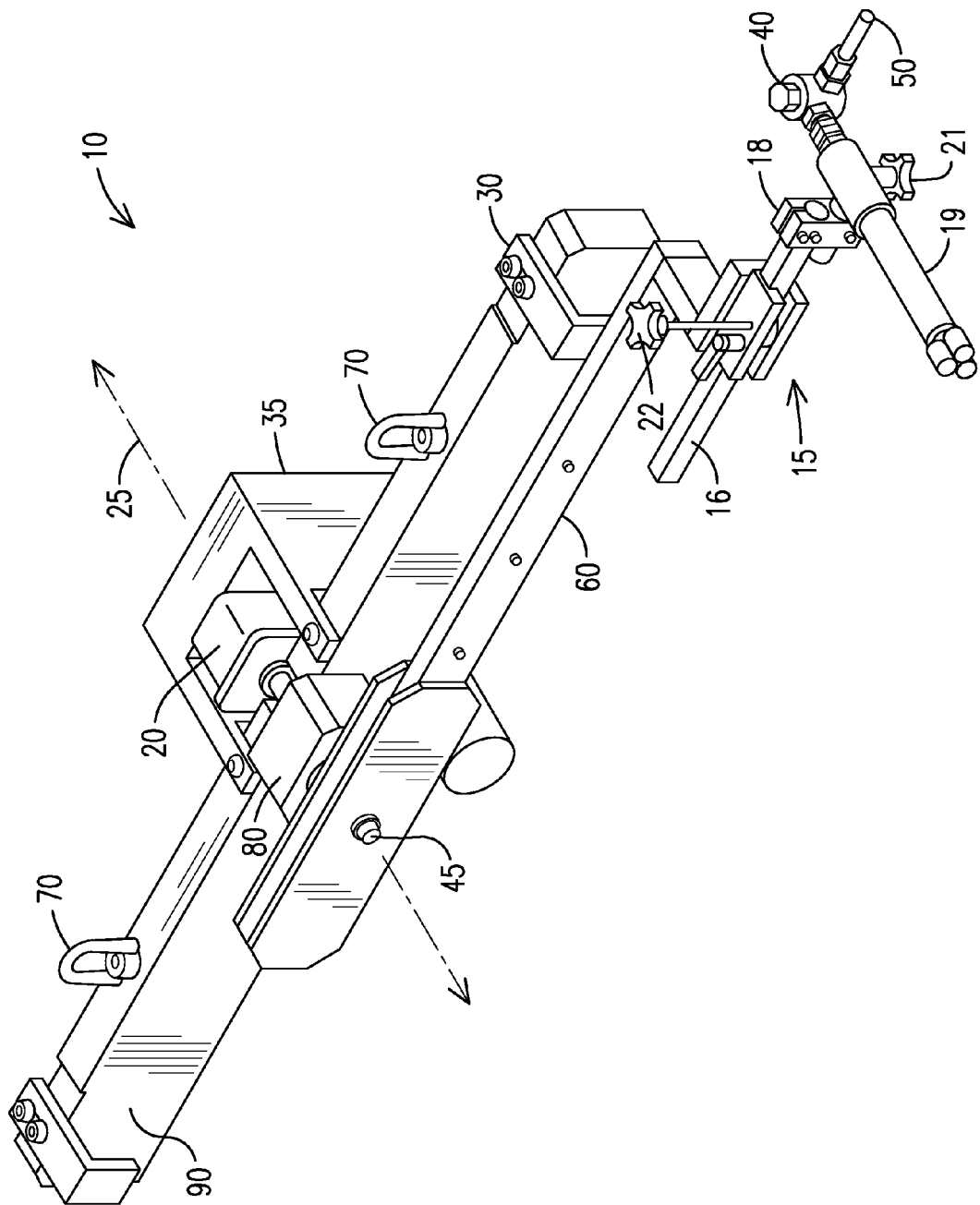
FIG. 1 illustrates a perspective view of a cutting apparatus according to an embodiment.

FIG. 1 shows a perspective view of a cutting apparatus 10 in accordance with an embodiment. The cutting apparatus 10 includes a cutting device 50 and a motor 20 for actuating the cutting device 50. The cutting device 50 is secured to an arm 60 that couples the cutting device 50 to the motor 20. The motor 20 is operable to rotate or angularly displace the arm 60 about a motor axis 25. The arm 60 extends radially with respect to the motor axis 25. In the assembled state, upon activation of the motor 20, the cutting device 50 is actuated via the arm 60 such that the cutting device travels 50 along an arc of a circle centered about the axis 25.

The cutting device 50 is, for example, a cutting tool effective to cut through a metallic workpiece. In the illustrated embodiment, the cutting device 50 is embodied as a torch which is designed to cut through sheet metal. The cutting device 50 is attached to the arm 60, for example, by a positioning system 15 which may be arranged between the arm 60 and the cutting device 50. The positioning system 15 may be configured to adjust the position of the cutting device 50 with respect to a workpiece along one or more directions.

Figure 2:
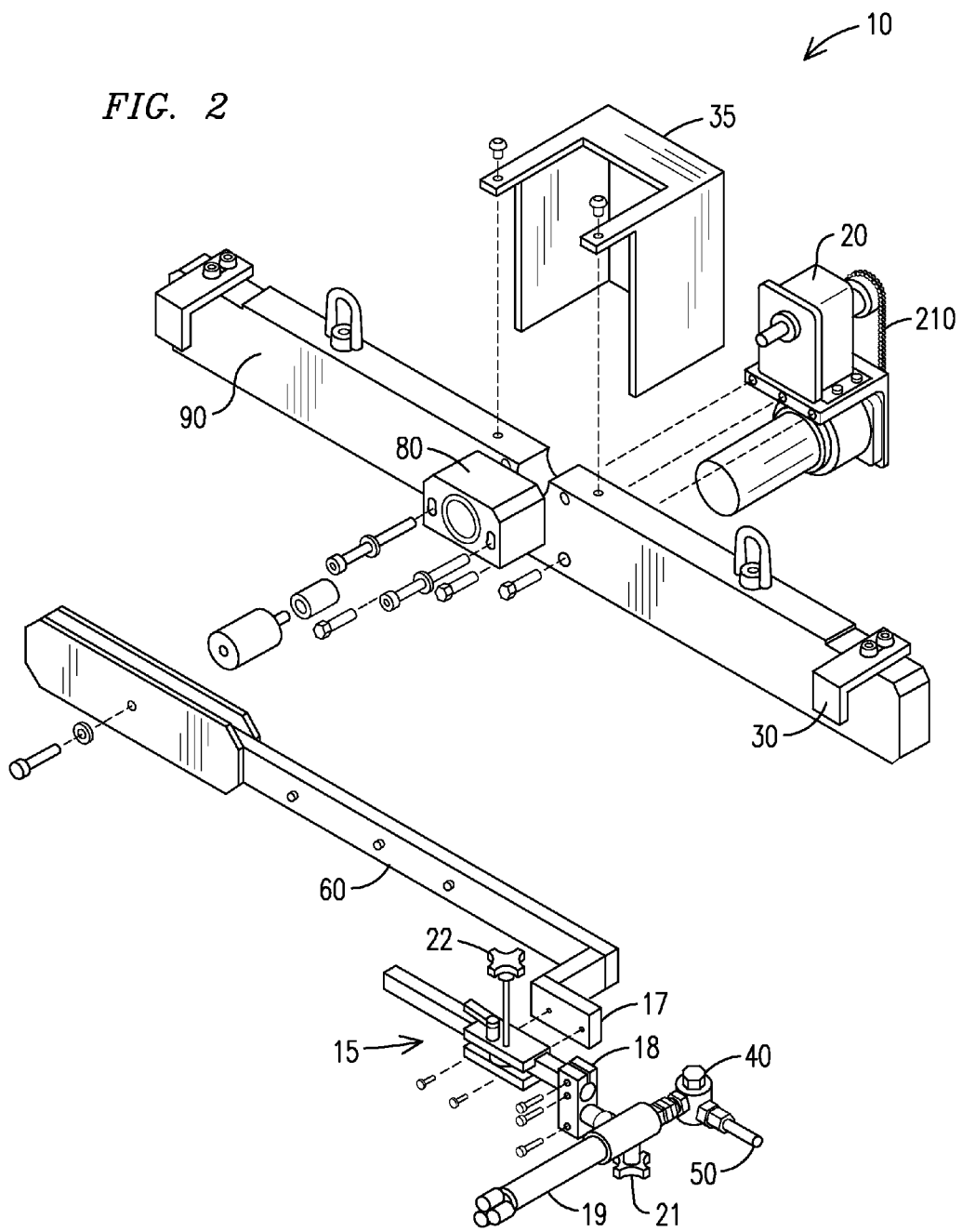
FIG. 2 illustrates an unassembled view of the cutting apparatus according to an embodiment.

According to FIG. 2, the positioning system includes a machined rack 16, a rackholder 17, a right angle clamp 18, and a holder assembly 19. The rackholder 17 allows movement of the cutting device 50 in the radial direction and is a longitudinal member with grooves that allow movement of the rackholder 17. By way of the rackholder 17, the positioning system 15 is positionable in the radial direction in order to adjust a cutting depth of the cylindrical element prior to the cutting. For example, the positioning system may be adjusted prior to the cutting. A first clamp 18 allows movement of the cutting device 50 along the axis 25, which is along the axis 25 of the motor 20 in FIG. 1 to adjust the cutting width. The cutting device 50 is inserted in the cylindrical holder assembly 19 and tightened with a first knob 21. For example, the holder assembly 19 may be embodied as a cylindrical holder to hold a torch. The holder assembly 19 includes the first knob 21, which by turning, the cutting device 50 is able to be repositioned in the axial direction. The angle of the torch tip may be adjusted using a torch tip angle adjustment adapter 40. In this example, the adapter 40 is embodied as a knob disposed above the torch tip which is configured to be turned in a clockwise and/or counterclockwise direction. The angle of the cutting device 50 may be adjusted prior to installation of the cutting apparatus on the workpiece or may be adjusted onsite.

The motor 20 may be attachable to a workpiece by way of a securing structure 90. In the example of FIG. 1, the securing structure 90 is embodied as a face plate, to which the radially extending arm 60 is pivoted by a pivot joint 45 which lies along the axis 25. To provide stability when the arm 60 rotates a bearing 80 may be provided. The bearing 80 may be embodied, for example, as a needle bearing. In the illustrated embodiment, the bearing 80 is mounted between arm 60 and a front face of the face plate 90. The motor 20 may be positioned behind the face plate 90. A housing 35 encloses the motor and may be connected to a back face of the face plate 90. The exemplary face plate 90 also includes lifting structures, such as lugs 70, via which a crane may lift the cutting apparatus 10 and position it against a workpiece. Alternatively, the face plate 90 may be manually positioned against the workpiece.

Figure 3:
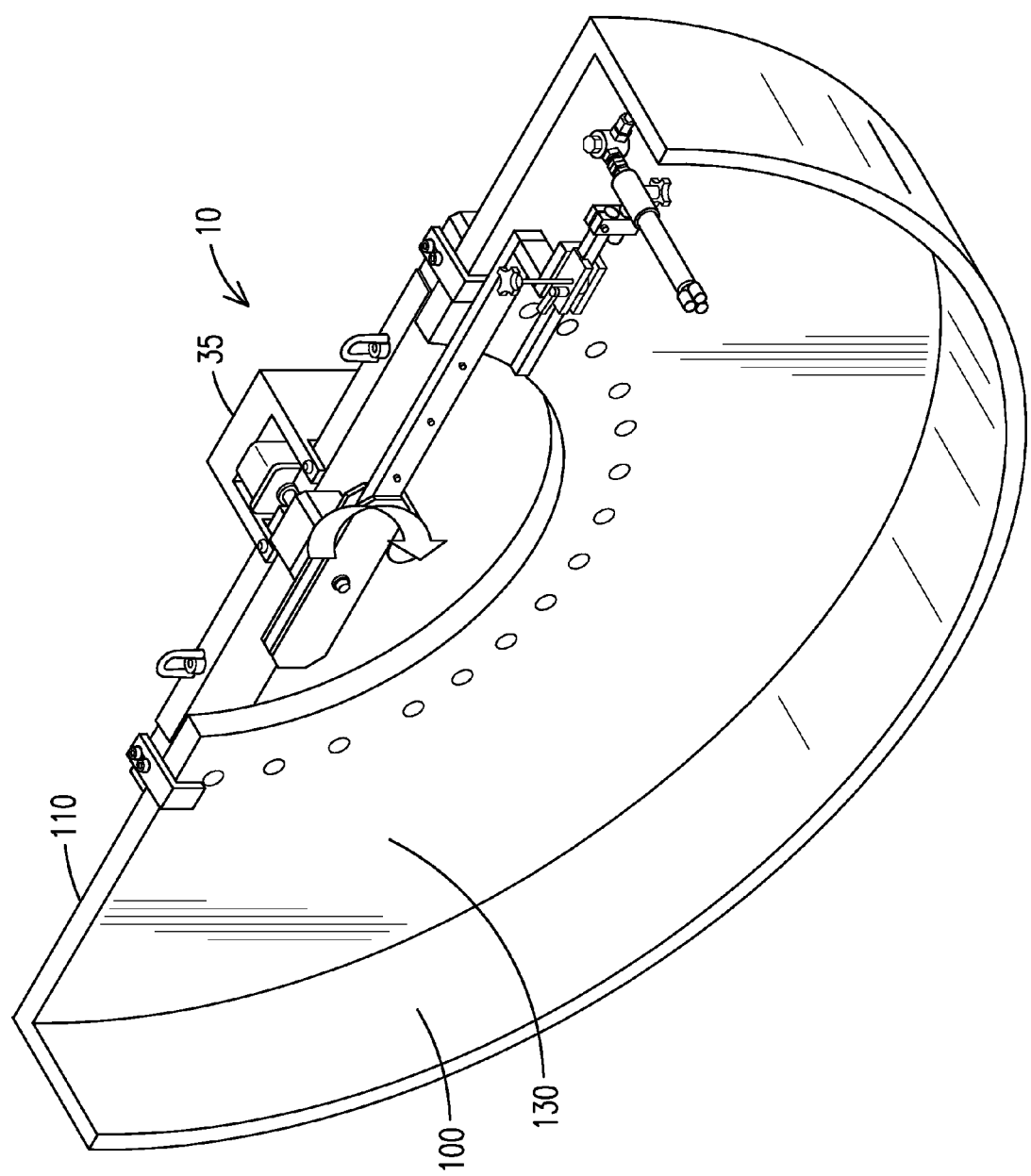
FIG. 3 illustrates a perspective view of the cutting apparatus of FIG. 2 attached to a workpiece according to an embodiment.
Figure 6:
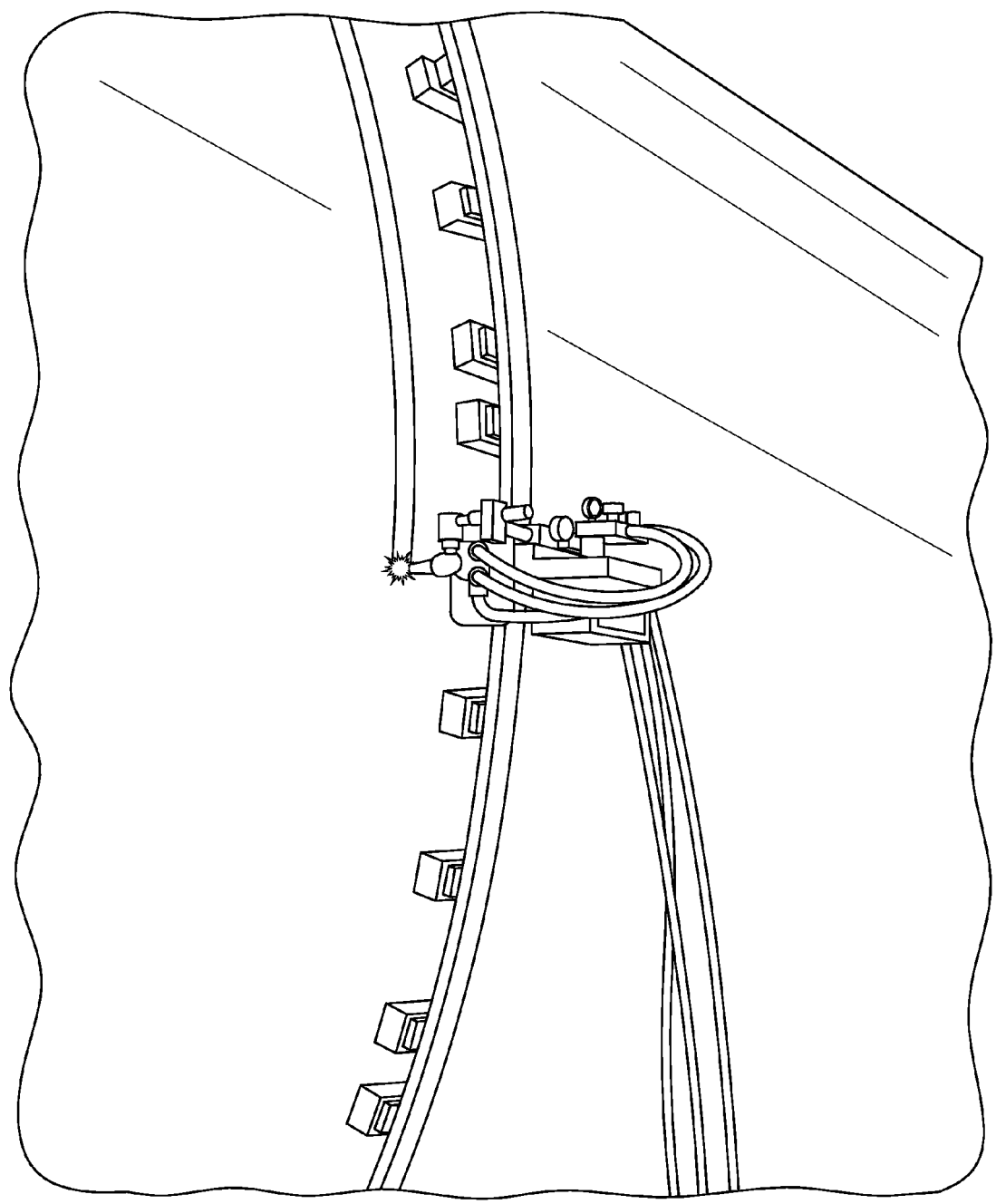
FIG. 6 illustrates a prior art track cutting tool.

FIG. 3 shows a perspective view of an arrangement of the cutting apparatus 10 of FIG. 1 attached to the workpiece 100. The workpiece 100 is a segment of a cylindrical element. In one embodiment, the workpiece 100 is a semicircular cylindrical flow cone of a low steam pressure turbine. The cutting apparatus 10 is attached to the cylindrical element 100 with clamps 30 which fix the face plate 90 of the cutting apparatus 10 against the back plate of the cylindrical element 100. In this embodiment and as shown in FIG. 5, second clamps 30 are for example L-shaped brackets with an oval shaped opening allowing for the second clamp 30 to be adjusted for the thickness of the back plate of the segment of the cylindrical element 100. At least two screws screw into the face plate 90 of the cutting apparatus 10 through the oval shaped opening.

In the shown embodiment, the cylindrical element 100 includes a semicircular face plate 110 with a thickness and a lip along the outer circumference of the face plate 110 in the axial direction including a width. An interior of the cylindrical element 100 may be defined as the face including the lip where the arm 50 and the cutting apparatus 10 are positioned. The cutting apparatus 10 is adjusted to a cutting depth along a radial direction using the positioning system 15 and the cutting device 50 is adjusted to a cutting width in the axial direction using the positioning system 15. The motor 20 is used to rotate the radially extending arm 60 and hence the cutting device 50 at a speed in the range of 10" to 12" per minute in one embodiment so that the cutting device may rotate around the circumference of the interior diameter of the segment up to 180 degrees. The radially extending arm may rotate in both the clockwise and counterclockwise directions cutting the lip of the element. The direction and speed of the cutting device will depend on the thickness of the lip. In the embodiment shown, the angle of the torch is perpendicular to the cutting surface, however, the angle may be adjusted to another angle using the torch tip angle adjustment adapter 40.

FIG. 4 shows a back view of the cutting apparatus. The motor 20 is shown in its housing 35. Also, enclosed in the housing is a chain 210 connected to a speed reducer 220 which reduces the rotation speed while adding torque value. The motor is also directly connected to a DC speed controller 200 which enables the motor 20 to change directions and controls the speed of the motor 20. In the shown embodiment, the motor 20 is an electric motor, but also may be embodied as a hydraulic or pneumatic motor.

A method for dimensioning a segment of a cylindrical element 100 is proposed. The cutting apparatus 10 is positioned against an interior diameter of the segment of the cylindrical element 100. The positioning includes securing the cutting apparatus to the cylindrical element 100. This positioning may be accomplished using a crane to lift the cutting apparatus by a plurality of lifting lugs 70 on the cutting apparatus and positioning the securing structure 90 of the cutting apparatus against a back face of the cylindrical element 100. Alternatively, the cutting apparatus can manually be placed against the back face of the cylindrical element 100. The cutting apparatus 10 is secured to the cylindrical element using a plurality of clamps 30. In the embodiment shown in FIG. 3, L-shaped clamps 30 are used to attach to the interior of the cylindrical element and screws are fastened into the securing element 90 of the cutting apparatus through an oval shaped opening in the clamp 30. Once the cutting apparatus 10 is secured to the cylindrical element 100, a cutting device 50 is attached to the cutting apparatus 10 by inserting the cutting device 50 into a cylindrical torch-holder assembly 19 and tightened with the first knob 21. Through the positioning of the cutting device 50 in the cylindrical torch-holder assembly, the cutting device 50 can be adjusted to a cutting depth along the axial direction. An angle of the cutting device 50, a cutting torch in the embodiment shown, may be adjusted using the torch tip adjustment adapter 40. In addition, the cutting device may be adjusted to a cutting depth along a radial direction using a knob 22 on the rackholder of the positioning system 15.

The speed of the motor 20 is adjusted prior to cutting the cylindrical element 100. Typically, the speed of the motor is in the range between 10" and 12" per minute which is chosen based on a typical thickness, between 1" and 2", of the lip of the cylindrical element and the type of material used. Thus, it would be understood that the speed of the motor is dependent on the thickness of the lip. The motor operates to rotate the radially extending arm about an axis extending in the Z direction with reference to FIG. 3 by 180 degrees in the illustrated embodiment and is controlled by a DC motor controller which controls the speed and direction of the radially extending arm 60. Upon activation of the motor, the cutting device is guided along a circumferential direction against the interior diameter of the cylindrical element 100.

Depending on the desired cut, the cutting device may rotate both in a clockwise and counter-clockwise direction with reference to the cylindrical element 100.

While specific embodiments have been described in detail, those of ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps, the use of articles "a" or "an" does not exclude a plurality, and the term "multiple" refers to "a plurality of", i.e., more than one.

What is claimed:

1. A method for dimensioning a segment of a cylindrical element comprising:
   positioning a cutting device against an interior diameter of the segment of the cylindrical element;
   activating a motor to rotate the cutting device about an axis to cut the cylindrical element;
   cutting the cylindrical element by way of the motor about the axis; and
   securing the cutting apparatus to the cylindrical element, wherein upon activation of the motor, the cutting device is guided along a circumferential direction against the interior diameter of the segment,
   wherein the securing includes attaching a first face plate of the cylindrical element to a second face plate of the cutting device using a plurality of clamps.

2. The method as claimed in claim 1, wherein the securing includes adjusting a clamp attached to the second face plate of the cutting device to the first face place of the cylindrical element.

3. The method as claimed in claim 1, further comprising adjusting the cutting device to a cutting depth along an axial direction.

4. The method as claimed in claim 1, further comprising adjusting the cutting device to a cutting width along a radial direction.

5. The method as claimed in claim 1, further comprising adjusting a torch tip angle for a torch tip.

6. The method as claimed in claim 5, wherein the torch tip angle is adjusted prior to the positioning.

7. The method as claimed in claim 5, wherein the torch tip angle is positioned 90° to a cutting surface.

8. The method as claimed in claim 1, further comprising adjusting the speed of the motor.

9. The method as claimed in claim 1, wherein the segment has a semi-circular cross-section, wherein the motor is operated to rotate the radially extending arm by 180 degrees.

10. A system comprising:
- a cutting device positioned against an interior diameter of a segment of a cylindrical element;
- a motor rotatable about an axis of the cylindrical element, and
- an arm extending in a radial direction of the cylindrical element that couples the motor with the cutting device,
- wherein upon activation of the motor, the cutting device is guided along a circumferential direction against the interior diameter of the segment,
- wherein a plurality of clamps are used to attach a first face plate of the cylindrical element to a second face plate of the cutting device.

\* \* \* \* \*